United States Patent Office 3,464,353
Patented Sept. 2, 1969

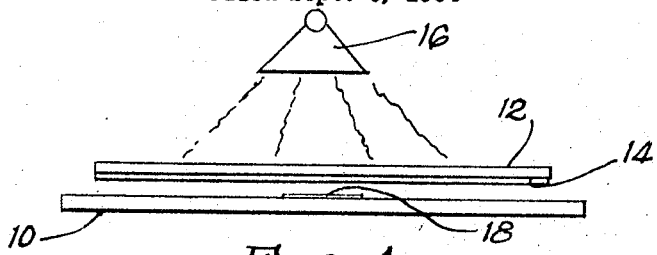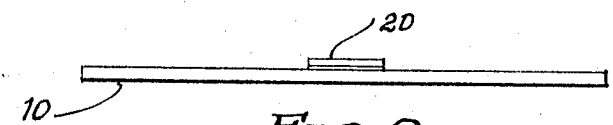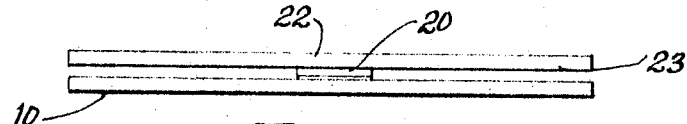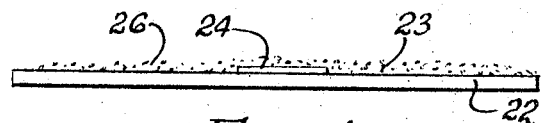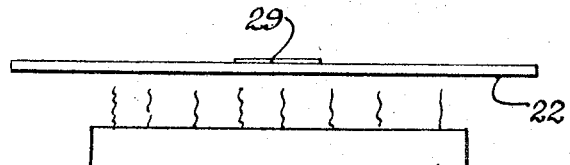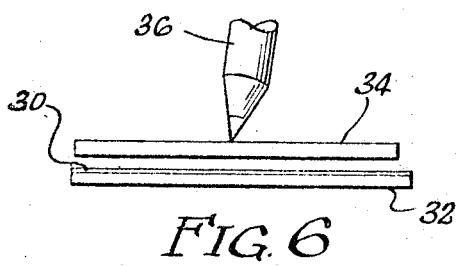

3,464,353
METHOD FOR PRODUCING COPIES
Frederick O. Bach, Villa Park, and Richard E. Thomas, Chicago, Ill., assignors to A. B. Dick Company, Niles, Ill., a corporation of Illinois
Filed Sept. 9, 1964, Ser. No. 395,269
Int. Cl. B41m 5/20
U.S. Cl. 101—470      4 Claims This invention relates to a novel method for producing copy corresponding to an original. Specifically, the invention concerns the production of one or more copies having image areas thereon corresponding to image areas present on an original.

There are, of course, a wide variety of techniques available for producing copies or reproductions of existing material. Among known systems, there are available photographic, lithographic, electrostatic, mimeographic and many similar arrangements.

In many of the above noted systems, it is necessary to provide relatively expensive constructions even where only a few copies are desired. Furthermore, some of these systems require the use of liquids or other materials which require initial setting-up operations. Obviously, an arrangement of this nature is not desirable where only a few copies are to be reproduced.

It is an object of this invention to provide a novel method for producing copies which finds particular use in the production of a single reproduction or a small number of reproductions.

It is a further object of this invention to provide methods of the type described which involve dry processing and which are relatively easy to employ.

It is a still further object of this invention to provide such methods without any requirement for the provision of unduly expensive mechanisms.

These and other objects of this invention will appear hereinafter and for purposes of illustration, but not of limitation, specific embodiments of this invention are shown in the accompanying drawings in which:

FIGURE 1 is a diagrammatic illustration of an assembly, including an original, during exposure to radiation;

FIGURE 2 is a diagrammatic illustration of an original after exposure in the assembly of FIGURE 1;

FIGURE 3 is a diagrammatic illustration of an assembly wherein a copy sheet is brought into contact with the original of FIGURE 2;

FIGURE 4 is a diagrammatic illustration of the copy sheet after contact with the original;

FIGURE 5 is a diagrammatic illustration of the copy sheet during fixing of a visible image thereon; and FIGURE 6 is an illustration of an alternative assembly suitable for practicing the concepts of this invention.

The instant invention is generally directed to the formation of copy wherein a tacky image is first formed on a surface which acts as the master in the method. When copy paper is pressed against this surface, at least part of the substance forming the tacky image is caused to adhere to the copy paper. Thereafter, toner particles are brought into contact with the image on the copy paper, and these particles are caused to adhere to these image areas. Suitable fixing techniques are then applied to the toner particles whereby a fixed image will be formed on the copy paper. It has been found that individual copies can be made in this fashion although the invention is also applicable to the production of multiple copies since a plurality of copy sheets can be successively pressed against the initially formed tacky image and in each case, a portion of the tacky substance will be caused to adhere to the copy paper.

In one contemplated form of the invention, the initial tacky image is formed by coating a relatively infrared transparent sheet with a layer of a relatively infra-red transparent thermoplastic tacky substance. This sheet is then disposed in contact with the surface of an original having an infra-red absorbing image and the assembly is exposed to infra-red radiation. The image areas on the original will generate heat whereby portions of the thermoplastic layer will be caused to transfer to the image areas on the original. This original then comprises the surface against which the copy paper is pressed to achieve the desired copy.

In the above described form of the invention, a reverse reading image is produced on the surface of the copy paper brought into contact with the surface of the original. Accordingly, the material on this surface must be read through the copy paper to provide a right reading image.

In an alternative form of this invention, a layer of tacky substance is provided and a surface intended to act as the master is brought into contact with this layer. Thereafter, an image is inscribed in a manner such that the tacky substance in the image area will be brought into contact with the master surface, and transfer of the substance will occur. Copy papers are brought into contact with the surface of the master whereby the tacky substance can be retransferred onto the copy paper. Again, the toner particles can be brought into contact with the image area on the copy paper and the adhered toner particles can then be fixed onto the paper.

FIGURES 1 through 5 of the accompanying drawings illustrate the application of the invention in one of its forms. In FIGURE 1, an original 10 is included in an assembly along with sheet 12. A tacky layer 14 is formed on this sheet with the tacky layer being disposed in substantial contact with the surface of the original. A source 16 of infra-red radiation is adapted to direct the infra-red rays directly toward the described assembly. As will appear, the thickness of the layer 14 is not critical but is selected depending on the number of copies desired.

In order to practice the invention shown in FIGURES 1 through 5, it is necessary that the sheet 12 be capable of passing the radiation. In addition, the original 10 will absorb less radiation than the image areas thereon. This results in a differential heat pattern being formed whereby heat generated in the image areas affects the thermoplastic layer 14. Accordingly, portions of the layer will be caused to adhere to the surface of the original. The image areas on the original are shown at 18 in FIGURE 1.

The transferred portion 20 of the layer 14 remains adhered to the image 18 when the sheet 12 is removed. Accordingly, an assembly of the nature shown in FIGURE 2 is provided after completion of the exposure portion of the operation.

A copy paper 22 is brought into contact with the original whereby the tacky substance 20 will contact the surface 23 of the copy paper. A certain amount of pressure might be applied depending on the degree of tackiness of the material 20. Furthermore, it is contemplated that the original carrying the tacky substance could be heated to a suitable point prior to or during contact with the sheet 22.

FIGURE 4 illustrates the sheet 22 bearing a portion 24 of the tacky substance. It will be obvious that this portion 24 will be in a location precisely corresponding to the image 18.

After the portion 24 has been formed on the sheet 22, a toner powder 26 is brought into contact with the surface of the copy paper. This toner powder will adhere to the substance 24, and thereafter the toner powder can be fixed in a suitable manner. In the illustrated embodiment, heating means 28 is employed for fixing image 29; however, toner powders which are fixed through the use of other mechanisms are obviously applicable to the instant invention.

FIGURE 6 illustrates an alternative form of the invention wherein a layer 30 of a tacky substance is formed over the surface of a member 32. A flexible sheet 34, which will ultimately act as the master, is placed over the layer 30. Means such as the pencil 36 are then employed for forming the desired image. The pressure applied causes the tacky substance 30 to adhere to the back side of the sheet 34. Accordingly, when the sheet 34 is separated, a reverse reading image is formed by the tacky substance on the back side of this sheet.

A copy sheet can then be brought into contact with the back side of the sheet 34 in the same manner as is illustrated in FIGURE 3. Thereafter, the same steps are followed for achieving a fixed image on the copy paper. It will be appreciated in considering FIGURE 6 that the coating 30 could be initially applied to the sheet 34 and transferred to the surface of 32 for formation of the master.

It is also contemplated that copy can be reproduced in accordance with the techniques of this invention by providing a relatively infra-red transparent sheet coated with a relatively infra-red transparent thermoplastic coating which is not tacky at room temperature. The sheet is imaged on the surface opposite the coating by typing, writing, or by other methods which will produce a differentially infra-red absorbing image. A master is provided by this technique and this imaged master is then contacted with copy paper, and the assembly is then exposed to infra-red radiation. The normally non-tacky coating will transfer only in the areas which are heated by reason of the absorption in the image areas. The copy paper can then be heated while contacted with toner whereby the image areas will become tacky and will hold the toner. The toned image can thereafter be subjected to a higher temperature for fusion of the toner and consequent fixing of the image.

It will be appreciated that various methods can be employed for achieving transfer of the tacky substance whereby the necessary masters can be formed and whereby copy paper can be provided with at least portions of the tacky substances. Thus, pressure can be applied by typing, writing, die-impressing, and similar methods and thermographic methods and the like are also obviously applicable. In this connection, it will be appreciated that a sheet of the type shown at 34 in FIGURE 6 could obviously be used to form a single copy.

The following examples will serve to illustrate the practice of this invention:

Example I

A wax layer (10 pounds per 3000 square feet of Halowax 1001 (chlorinated naphthalene) on thin glassine paper) was thermographically transferred onto the character areas defined on a magazine page. This transfer was accomplished in the manner illustrated in FIGURE 1.

The tacky image on the magazine page was then brought into contact with the translucent parchment copy paper forming a latent wax image thereon. Pressure was applied in the course of this operation to achieve transfer of the wax completely over the image areas.

The copy paper was then dusted with toner powder and the paper was exposed to heat to fix the image thereon. Nine additional copies were produced by repeating the above steps using the same wax image originally produced on the magazine page. The copy produced was reverse reading.

Example II

A piece of parchment paper was placed over a Halowax 1001 coated sheet of glassine. Characters were drawn on the parchment with lead pencil. The parchment was separated from the wax coated sheet and wax was observed on the reverse side of the sheet in areas corresponding to the characters drawn.

The parchment master was then placed in contact with copy sheets in 11 separate operations. Toner powder was dusted over the copy sheets and suitable right reading copies were produced in all cases when the toner powder was fixed to the image areas.

Example III

Successful copy production also was achieved using the procedure of Example I while employing Mobilwax 2305BR-2 as the overcoating waxes in place of the Halowax 1001. The Mobilwax is a microcrystalline wax containing 2 percent butyl rubber.

Example IV

Suitable copy production was also achieved using the procedure of Example I but employing Petrex SS-70A (an alkyd resin) in place of the Halowax 1001.

In the above described operations, the particular waxes and resins could be utilized at room temperature since tackiness characterized these materials and the materials adhered to copy paper through the use of pressure alone. It is contemplated, however, that certain tacky substances can be more suitably used by employing elevated temperatures along with the pressure application. The resulting increase in tackiness can be controlled so that the conditions for achieving the best copy with given compositions can be readily achieved. It will be obvious that the invention is not limited to any particular types of waxes or resins and all such resins, which are capable of being transferred to a copy sheet when the described contact is achieved, are contemplated.

It will be apparent that the toner powders employed for dusting the copy sheets can be selected from a broad category of available materials. Since the latent image is tacky, the dusting powder may simply comprise a dye in powder form since such dye will adhere to the copy surface. It will be apparent, however, that fixing of the image on the surface is an important criteria and, therefore, the use of known powders comprising a dye and associated binders is most advantageously combined with the procedures of this invention. Finely divided powders of the type employed in the Videograph and Xerox systems are ideally suited for the practice of the instant invention. These powders can be fixed by heat to the copy surface and the fixing procedure can be undertaken with a minimum of expense. Other powder developers fixed by other known methods are also contemplated.

The advantages of the instant invention will be obvious to one familiar with known copying techniques. The system is ideally suited for the production of one or more copies of an original, and there are no expensive constructions necessary for undertaking the processing. This aspect of the invention will be particularly apparent when considering the procedure outlined in Example II.

The process of this invention is extremely clean since it does not involve the use of fluids as in spirit processes, and since any color image can be produced depending on the toner powder selected. Furthermore, copies can be made on practically any smooth paper.

It will be understood that various changes and modifications can be made in the above described systems which provide the characteristics of this invention without departing from the spirit thereof particularly as defined in the following claims.

That which is claimed is:

1. A method for producing copy comprising the steps of providing a master sheet having an exposed surface, forming a tacky image on said surface, said image being formed from substances selected from the group consisting of thermoplastic waxes and resins, pressing a copy paper against said surface whereby at least part of the substance forming said tacky image will adhere to said copy paper, bringing toner particles into contact with the image on said copy paper whereby said particles will adhere to the image areas thereon, and fixing the adhered particles to said copy paper to form a visible image and repeating the steps beginning with pressing a copy paper against said imaged surface with additional sheets of copy paper to produce multiple copies from the tacky image on the master sheet.

2. A method in accordance with claim 1 including the step of heating said image after formation on said surface for improving the tackiness of the image.

3. A method for producing copy comprising the steps of providing an original having differential infra-red radiation absorbing areas thereon, said areas corresponding to the image to be reproduced, providing a layer of a relatively infra-red transparent thermoplastic tacky substance on a relatively infra-red transparent sheet, disposing said sheet over the surface of the original bearing said image with the tacky substance adjacent the image, exposing the assembly to infra-red radiations whereby the image areas will generate heat resulting in transfer of said tacky substance to the image areas on the original, pressing a copy paper against the surface of the original bearing the tacky substance whereby at least part of the substance will adhere to said copy paper, bringing toner particles into contact with said copy paper whereby said particles will adhere to the tacky substance located thereon, and fixing the adhered particles to said copy paper and repeating the steps beginning with pressing a copy paper against the surface of the original bearing the tacky image with a plurality of additional sheets of copy paper for transfer of tacky substance to the copy sheets to produce multiple copies from the tacky image on the original.

4. A method in accordance with claim 3 wherein the copy paper is heated to cause the transfer coating to become tacky for holding the toner particles in place, and wherein the copy paper is heated to a higher temperature for fusion of the toner particles and for fixing of the toner particles on the copy paper.

References Cited

UNITED STATES PATENTS

| | | | |
|---|---|---|---|
| 2,254,483 | 9/1941 | Hess et al. | 101—149.4 |
| 3,122,998 | 3/1964 | Raczynski et al. | 101—149.4 X |
| 3,129,661 | 4/1964 | Newman | 101—149.2 |

ROBERT E. PULFREY, Primary Examiner

J. A. BELL, Assistant Examiner

U.S. Cl. X.R.

101—467